(12) United States Patent
Simpson et al.

(10) Patent No.: US 8,166,350 B2
(45) Date of Patent: Apr. 24, 2012

(54) APPARATUS AND METHOD FOR PERSISTENT REPORT SERVING

(75) Inventors: David John Simpson, North Vancouver (CA); Philipp Ziegler, Vancouver (CA)

(73) Assignee: Business Objects Software Ltd., Dublin (IE)

( * ) Notice: Subject to any disclaimer, the term of this patent is extended or adjusted under 35 U.S.C. 154(b) by 0 days.

(21) Appl. No.: 12/718,884

(22) Filed: Mar. 5, 2010

(65) Prior Publication Data

US 2010/0162254 A1    Jun. 24, 2010

Related U.S. Application Data

(63) Continuation of application No. 11/303,038, filed on Dec. 14, 2005, now Pat. No. 7,681,087.

(51) Int. Cl.
*G06F 11/00* (2006.01)

(52) U.S. Cl. ..................................... 714/47.1

(58) Field of Classification Search .............. 714/15, 714/47, 57, 48, 47.1; 718/102
See application file for complete search history.

(56) References Cited

U.S. PATENT DOCUMENTS

| | | | |
|---|---|---|---|
| 4,798,178 A | 1/1989 | Jennings et al. | |
| 5,010,482 A | 4/1991 | Keller et al. | |
| 5,220,668 A * | 6/1993 | Bullis | 718/102 |
| 5,721,904 A | 2/1998 | Ito et al. | |
| 5,815,403 A | 9/1998 | Jones et al. | |
| 6,216,127 B1 * | 4/2001 | Gans et al. | 1/1 |
| 6,341,302 B1 * | 1/2002 | Celis | 718/100 |
| 6,385,644 B1 * | 5/2002 | Devine et al. | 709/206 |
| 6,640,238 B1 | 10/2003 | Bowman-Amuah | |
| 6,728,962 B1 | 4/2004 | Chalmer et al. | |
| 6,947,952 B1 * | 9/2005 | Welch et al. | 1/1 |
| 6,988,139 B1 * | 1/2006 | Jervis et al. | 709/226 |
| 7,363,346 B2 | 4/2008 | Groner et al. | |
| 7,587,725 B2 * | 9/2009 | Morrison et al. | 719/330 |
| 2001/0047355 A1 | 11/2001 | Anwar | |
| 2002/0180810 A1 * | 12/2002 | Charters et al. | 345/853 |
| 2003/0023435 A1 | 1/2003 | Josephson | |
| 2003/0037290 A1 | 2/2003 | Price et al. | |
| 2003/0041031 A1 | 2/2003 | Hedy | |
| 2003/0046396 A1 | 3/2003 | Richter et al. | |
| 2003/0110416 A1 | 6/2003 | Morrison et al. | |
| 2003/0197733 A1 | 10/2003 | Beauchamp et al. | |
| 2004/0268317 A1 * | 12/2004 | Gouriou et al. | 717/130 |
| 2007/0124363 A1 * | 5/2007 | Lurie et al. | 709/202 |

* cited by examiner

*Primary Examiner* — Scott Baderman
*Assistant Examiner* — Yair Leibovich
(74) *Attorney, Agent, or Firm* — Mintz, Levin, Cohn, Ferris, Glovsky and Popeo, P.C.

(57) ABSTRACT

A computer-readable medium is configured to receive a report processing request at a hierarchical report processor. The hierarchical report processor includes a parent process and at least one child process executing on a single processing unit, and is configured to process the report processing request as a task on the single processing unit.

17 Claims, 7 Drawing Sheets his application is a continuation of U.S. Ser. No. 11/303,038, filed Dec. 14, 2005, now U.S. Pat. No. 7,681,087 entitled "Apparatus and Method for Persistent Report Serving."

APPARATUS AND METHOD FOR PERSISTENT REPORT SERVING

CROSS-REFERENCE TO RELATED APPLICATION

This application is a continuation of U.S. Ser. No. 11/303,038, filed Dec. 14, 2005, now U.S. Pat. No. 7,681,087 entitled "Apparatus and Method for Persistent Report Serving."

BRIEF DESCRIPTION OF THE INVENTION

The present invention relates generally to report processing. More particularly, this invention relates to a technique for enhancing the reliability of report processing systems.

BACKGROUND OF THE INVENTION

In recent years, report processing technologies have permeated business information systems to the point where the reliability, scalability, and flexibility of report processing directly impacts the operational efficiency of an organization's business processes. As a result, users expect a report processing system to satisfy each user request within a short and predictable time to handle a large number of simultaneous user requests, and to provide a rich feature set. Because many business intelligence (BI) software applications ultimately fail in production due to a lack of scalability or flexibility, BI software vendors have focused their efforts toward developing feature-rich report processing software that continues to function while supporting a large number of simultaneous users. However, little progress has been made on report processing software solutions designed to ensure the sustained, long-term reliability of report processing servers in these systems.

Business Intelligence (BI) generally refers to software tools used to improve enterprise decision-making, where an enterprise is a business, government body, non-profit organization, and the like. These tools are commonly applied to financial, human resource, marketing, sales, customer and supplier analyses. More specifically, these tools can include: reporting and analysis tools to present information; content delivery infrastructure systems for delivery and management of reports and analytics; data warehousing systems for cleansing and consolidating information from disparate sources; and data management systems, such as relational databases or On Line Analytic Processing (OLAP) systems used to collect, store, and manage raw data.

A subset of business intelligence tools are report generation tools. There are a number of commercially available products to produce reports from stored data. For instance, Business Objects Americas of San Jose, Calif., sells a number of widely used report generation products, including Crystal Reports™, Business Objects OLAP Intelligence™, and Business Objects Web Intelligence™, and Business Objects Enterprise™. As used herein, the term report refers to information automatically retrieved (i.e., in response to computer executable instructions) from a data source (e.g., a database, a data warehouse, and the like), where the information is structured in accordance with a report schema that specifies the form in which the information should be presented. A non-report is an electronic document that is constructed without the automatic retrieval (i.e., in response to computer executable instructions) of information from a data source. Examples of non-report electronic documents include typical business application documents, such as a word processor document, a spreadsheet document, a presentation document, and the like.

FIG. 1 illustrates the typical response of a prior art report processing server to an error condition encountered while processing a request. A server 101 is a computer capable of supporting many users (clients), each of whom, for example, could request to view one of many different reports. When a client request 100 is received by the server 101, the request 100 can be queued as a task 104A by a request router 102. Request router 102 and tasks 104A-1004N are all part of process 103. If a client request 100 is to a corrupt report, that is a report that will generate one or more error conditions, the resources of the server 101 can be fully engaged in attempting to service the request 100. Error conditions include infinite loops, pseudo-infinite loops, improper memory access, and improper communication requests that cannot be resolved. An error condition, say at task 104A, effectively renders the server 101 unavailable for servicing subsequent tasks 104B-104N until the request 100 is terminated and the computing resources of the server 101 are freed. In other words, process 103 is locked up until it is freed of task 104A. This scenario illustrates that failure can ensue—regardless of the number of clients—when a single client request somehow results in an error condition that hinders the processing capability of the system. For report processing servers, diminishment of processing capabilities has a wide effect because report processing is intensive with respect to communication, database, and processing resources.

To address this shortcoming, BI software vendors generally use simple mechanisms to terminate user requests that cannot be satisfied within a given time period. However, this solution is not robust because the report processing server is not capable of supporting any other user requests until the corrupt request is removed, resulting in a potentially large number of denied or substantially delayed requests. More sophisticated, hardware-intensive solutions generally rely on running more than one processing application on a server that supports this, such as a server containing multiple processors. In this scenario, only those processing applications running on the same processor as the corrupt request is hindered, and processing applications running on other processors continue to service user requests. This type of solution, though improving the reliability of a report processing system, is resource intensive and may not be feasible for users without the necessary advanced hardware. Further, this solution is not completely satisfactory as a server may elect to dedicate substantial resources (e.g., processor time) to servicing a corrupt request. These resources would not be available to other requests, hindering the performance of any server including multiprocessor servers. Accordingly, it would be desirable to provide a report processing software solution for mission-critical enterprise deployments designed to ensure the sustained, long-term reliability of report processing servers using a single processor.

SUMMARY OF THE INVENTION

This invention includes a computer readable memory to direct a computer to function in a specified manner. In one embodiment, the computer-readable medium comprises instructions to receive a report processing request at a hierarchical report processor including a parent process and at least one child process executing on a single processing unit, and instructions to process the report processing request as a task on the single processing unit. The computer-readable medium may further comprise instructions to monitor a performance indicator of the task, instructions to compare the performance indicator to a performance requirement, and instructions to provide an error notification if the performance indicator fails to meet the performance requirement, indicating a task error condition for the task.

In another embodiment, the computer-readable medium comprises instructions to receive a report processing request at a hierarchical report processor including a parent process and at least one child process executing on a single processing unit, instructions to process the report processing request as a task on the single processing unit, instructions to choose between selection of a child process and creation of a new child process for processing the task, based on a choice by the parent process, and instructions to monitor a performance indicator of the task using the parent process.

In another embodiment, the computer-readable medium comprises instructions to receive a report processing request at a hierarchical report processor including a parent process and at least one child process executing on a single processing unit, instructions to process the report processing request as a task on the single processing unit, instructions to monitor a response time of the parent process using the child process, instructions to stop the child process if the response time exceeds a maximum response time, instructions to stop the child process, based on a stop determination by the parent process, and instructions to remove the child process if the child process is stopped or if the child process is dead.

BRIEF DESCRIPTION OF THE DRAWINGS

For a better understanding of the nature and objects of the invention, reference should be made to the following detailed description taken in conjunction with the accompanying drawings, in which.

Like reference numerals refer to corresponding parts throughout the several views of the drawings.

DETAILED DESCRIPTION OF THE INVENTION

Figure 1:
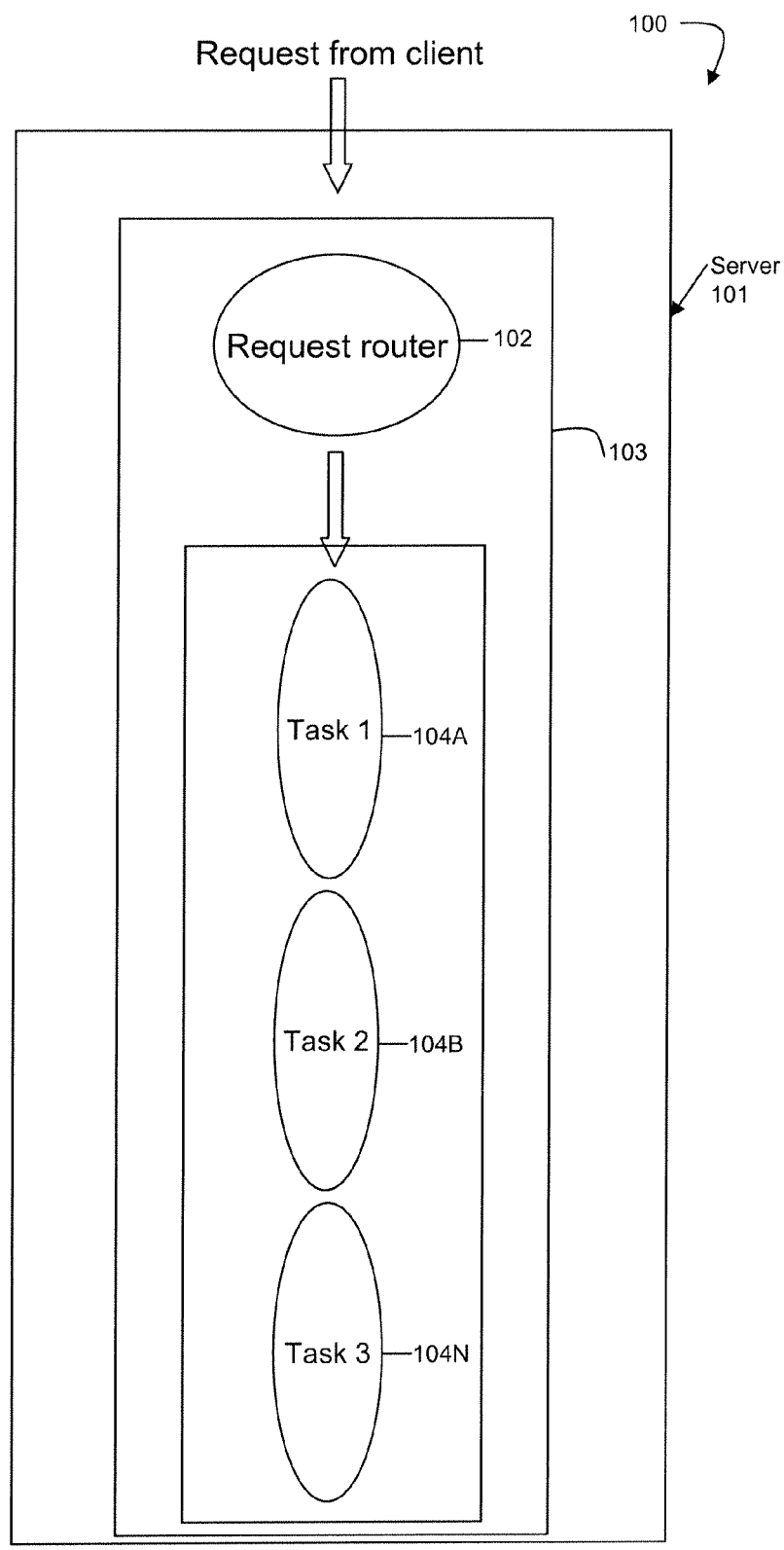
FIG. 1 illustrates the typical response of a report processing server to an error condition encountered while processing a request, in accordance with prior art.
Figure 2:
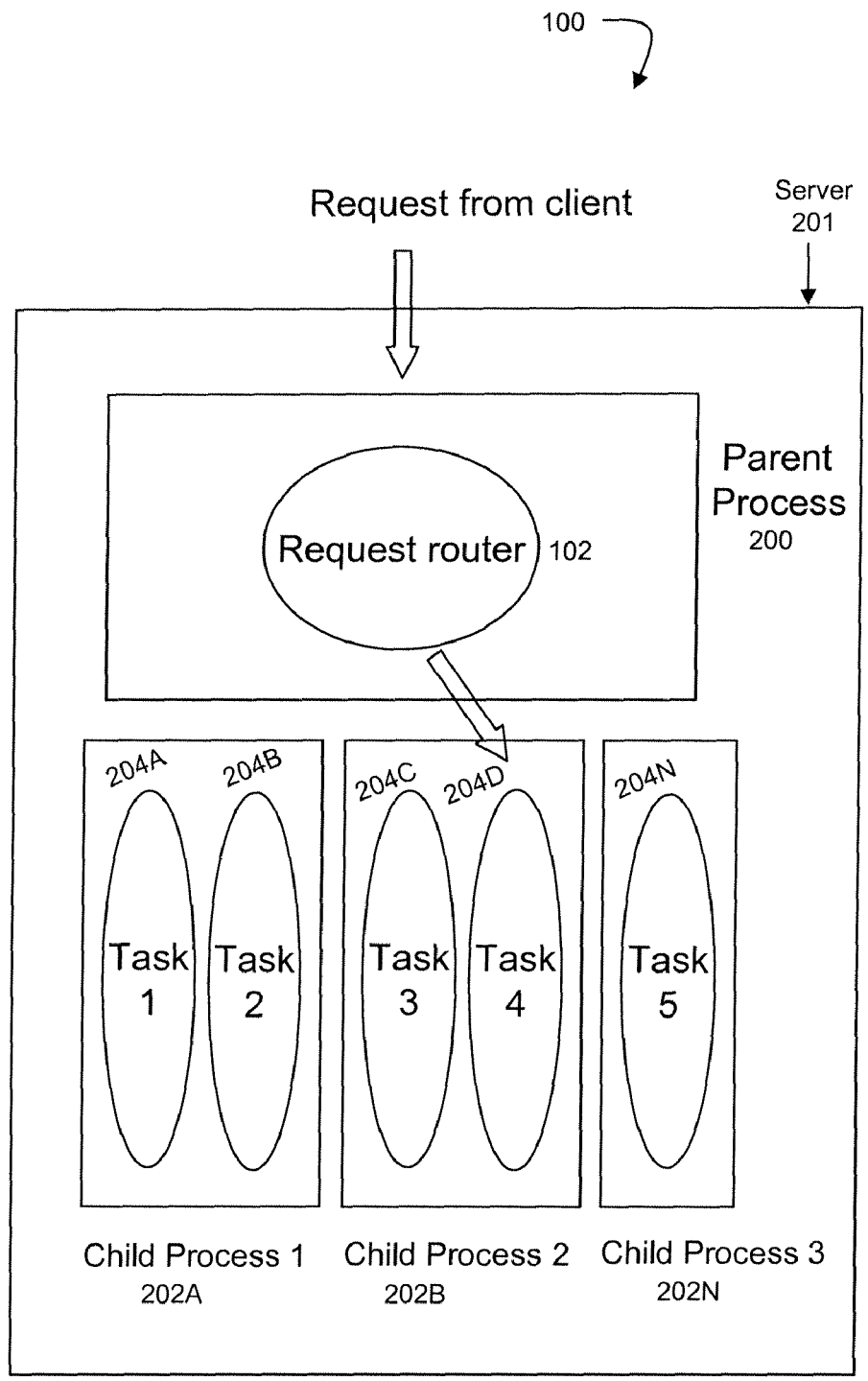
FIG. 2 illustrates the response of a reliable report processing server to an error condition encountered while processing a request, in accordance with one embodiment of the present invention.

FIG. 2 illustrates the response of a reliable report processing server 201 to an error condition encountered while processing a request 100, in accordance with one embodiment of the present invention. The reliable report processing server 201 executes software containing a hierarchical report processor, which allows for the sustained availability of report processing that is not impacted by request lock-ups or failures within a report processing application process. In a hierarchical report processor, a parent process 200 creates at least one child process 202 to host tasks 204 resulting from client requests 100. Examples of a task 204 include making a report available to a client for viewing, drilling down within a report, and printing a report. In this example, the parent process 200 receives the client request 100 and executes a request router module 102 to post the request 100 to a child process 202B as a task 204D. The child process 202B is processing a task 204C as well as task 204D; according to one or more embodiments of the present invention, each child process 202 can process multiple tasks 204 by assigning each task 204 to one of multiple threads of execution in the child process 202.

The principle underlying the hierarchical report processor architecture is that the impact of errors resulting from failures of report processing requests 100 can be limited to a small subset of tasks 204 executing on the server 201 if execution of the tasks 204 is divided among many child processes 202, and if management functionality necessary to recover from a failure executes on a separate parent process 200. In the event of a lock-up or failure of task 204D, the child process 202B is fully engaged in attempting to service the request 100 that cannot be resolved. As a result, child process 202B is unavailable to service task 204C. However, since the parent process 200 handles stable processing components not dependent on the content of individual reports, the parent process 200 is unaffected if task 204D locks up or fails. The execution of tasks 204 (204A, 204B, and 204N in this example) on other child processes (202A and 202N in this example) is unaffected as well. The parent process 200 retains control of management functions such as creation and removal of child processes 202. The parent process 200 can, through monitoring of child processes 202, determine whether (and when) to remove the child process 202B to free resources of the server 201 associated with the child process 202B. Resources associated with a child process in a report processing server include processor time, data source connections and memory. The parent process 200 can, through monitoring of tasks 204, determine whether (and when) to stop a task.

Figure 3:
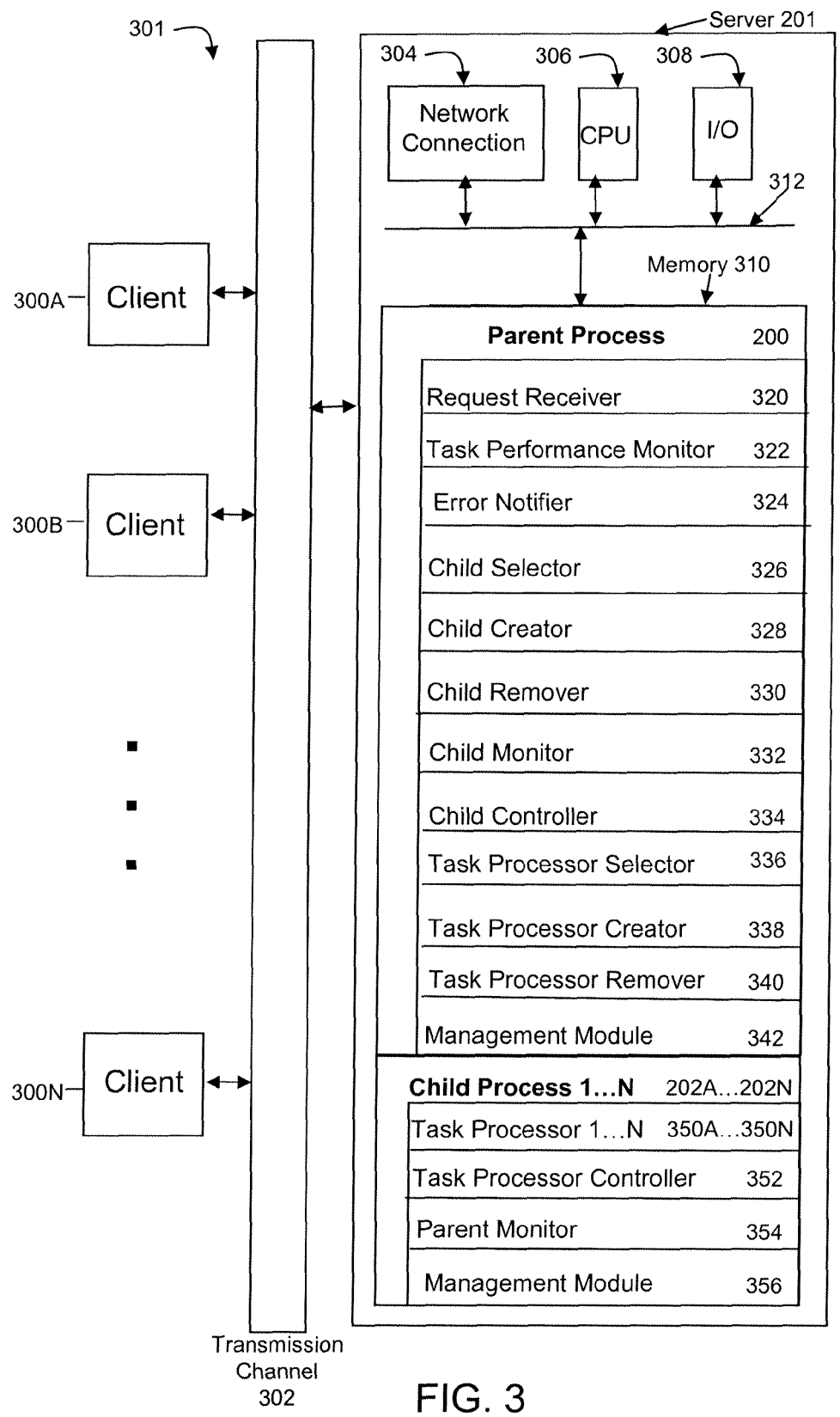
FIG. 3 illustrates a report processing server, operative in a networked environment, which is configured in accordance with one embodiment of the present invention.

FIG. 3 illustrates a report processing server 201, operative in a networked environment, which is configured in accordance with one embodiment of the present invention. The network 301 includes a set of client computers 300A-300N, which communicate with a server computer 201 via a transmission channel 302. The server 201 includes standard components, such as a network connection 304, a CPU 306, and an input/output module 308, which communicate over a bus 312. A memory 310 is also connected to the bus 312. The memory 310 stores a set of executable programs that are used to implement the functions of the invention. The client computers 300 include the same standard components. The functions of the invention are implemented without relying on multiple CPU hardware systems. However, embodiments of the present invention can be implemented and executed on computer hardware with multiple CPUs. Report processing server 201 may include, or be coupled to, a data source (e.g., a database, a data warehouse, and the like). The data source could be attached to bus 312 or coupled to 201 through a transmission channel 302. The data source can include data and it can include a database management system (DBMS).

The memory 310 stores executable instructions to implement operations of the invention. These are stored as modules described below. The modules stored in memory 310 are exemplary. It should be appreciated that the functions of the modules maybe combined. In embodiments of the present invention not all functions are present. In addition, the functions of the modules need not be performed in a networked environment. Instead of a client-server setup, the functions may reside on one machine, if desired. It is the functions of the invention that are significant, not where they are performed or the specific manner in which they are performed.

In an embodiment of the invention, the memory 310 stores executable instructions establishing a parent process 200 with modules including a request receiver 320, a task performance monitor 322, an error notifier 324, a child selector 326, a child creator 328, a child remover 330, a child monitor 332, a child controller 334, a task processor selector 336, a task processor creator 338, a task processor remover 340, and a management module 342. The memory 310 also stores executable instructions establishing one or more child processes 202A-202N, each of which has modules including one or more task processors 350A-350N, a task (processor) controller 352, a parent monitor 354, and a management module 356.

Figure 4:
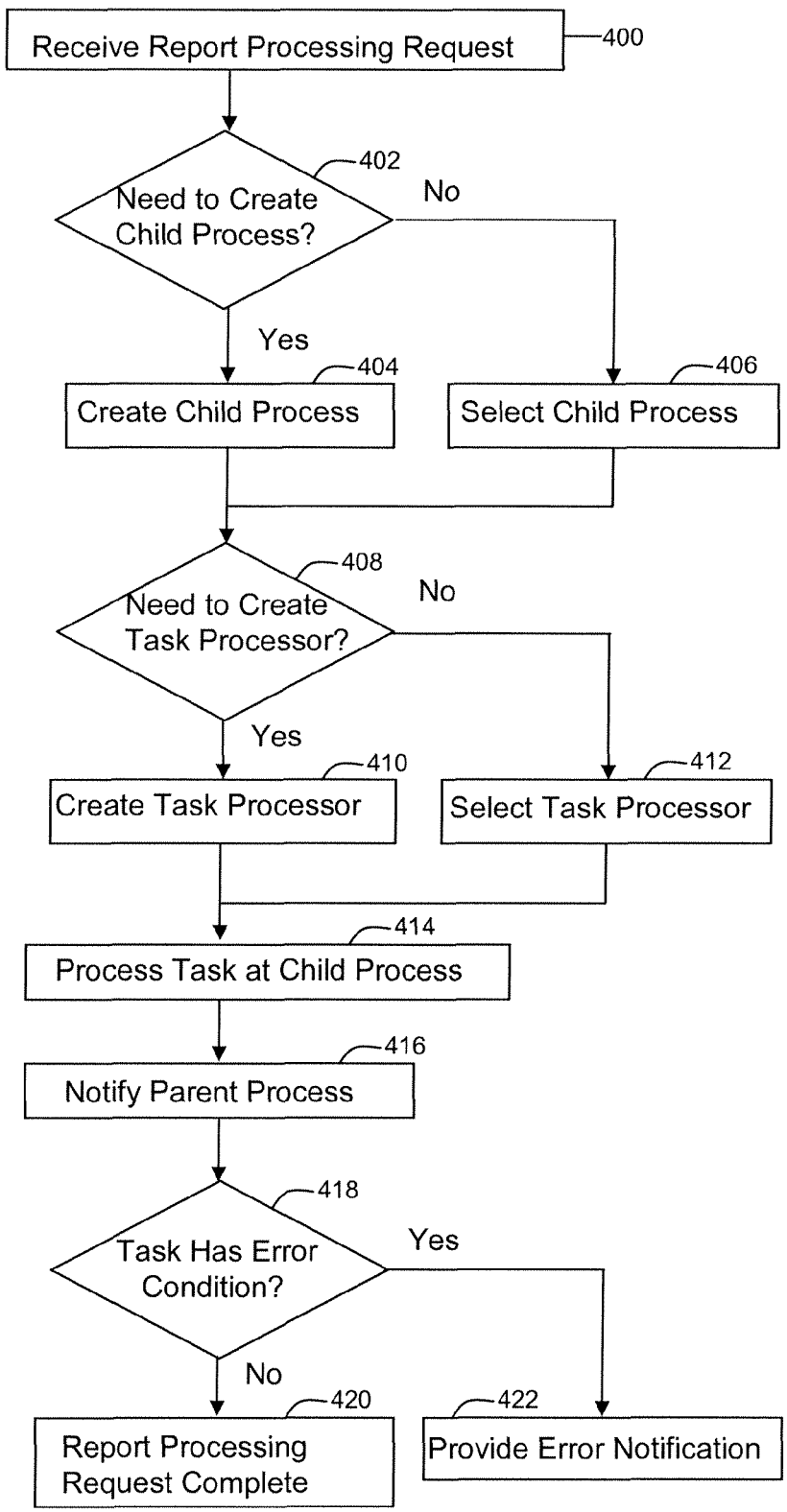
FIG. 4 illustrates operations associated with processing a report processing request, in accordance with one embodiment of the present invention.

FIG. 4 illustrates operations associated with processing a report processing request 100, in accordance with one embodiment of the present invention. The parent process 200 receives a report processing request 100 from a client 300 using the request receiver 320 (block 400). The request receiver may be a Common Object Report Broker Architecture (CORBA) object that receives the request 100 and pushes the request 100 into a request queue. The parent process 200 determines whether to create a new child process 202 using child controller 334 (block 402). The child controller 334 may first determine if each existing child process 202 is eligible to process the request 100 by accessing child description information. This child description information may be stored for each existing child process 202 in child descriptor objects in the memory 310. If a child process 202 is eligible to process the request 100, the child controller 334 may then determine if the request 100 can be processed by an existing task processor 350 of that child process 202 by accessing task processor description information. This task processor description information may be stored for each existing task processor 350 in task processor descriptor objects in the memory 310.

In an embodiment, a child process 202 may be eligible to process a request 100 if the child process 202 is alive and does not have an ineligibility condition. The child process 202 may be determined to be alive by the child monitor 332 if a CORBA object in the child monitor 332 of the parent process 200 has received a keep-alive notification from the management module 356 of the child process 202 within a maximum child response time. A lock-up or failure of a task processor 350 of the child process 202 are examples of conditions that may result in the child monitor 332 determining that the child process 202 is dead. A possible example of an ineligibility condition of the child process 202 is the parent process 200 requesting that the child process 202 stop. Other possible examples of ineligibility conditions of the child process 202 are a task processor 350 of the child process 202 exceeding a maximum task processing time during the processing of a task 204, and the child process 202 exceeding a maximum lifetime parameter. The maximum lifetime of the child process 202 may be measured by a maximum number of task processors 350 that can be created on the child process 202. The maximum lifetime of the child process 202 may be measured by a maximum up-time (time since creation) of the child process 202. Another possible example of an ineligibility condition for the child process 202 is the child process being assigned a designated status, e.g., a gray mark. In this example, when a child process 202 is assigned a gray mark it does not accept any more task processes.

In an embodiment, a task processor 350 of a child process 202 may be eligible to process a request 100 if the child process 202 has been found eligible to process the request 100, the task processor 350 has not exceeded a maximum task processing time in the processing of a task 204, and the task processor 350 has not been idle for more than a task processing idle time. The task processor 350 may be considered idle if the task processor 350 is not processing a task 204 and has no pending tasks 204 awaiting processing. In an embodiment, a task processing idle time is equal to the maximum task processing time.

In the embodiment shown in FIG. 4, if the child controller 334 determines that one or more task processors 350 of one or more child processes 202 are eligible to process the request 100 (block 402—NO), then the child selector 326 selects the child process 202 based on, for example, a computed or measured processing load of the child process 202 (block 406). Otherwise (block 402—YES), the child controller 334 directs the child creator 328 to create a new child process 202 for the request 100 (block 404). If an existing child process 202 has been selected by the child selector 326 (block 408), then one of the task processors 350 of the child process 202 is selected by the task processor selector 336 (block 412). Otherwise, if a new child process 202 has been created by the child creator 328, then a new task processor 350 is created by the task processor creator 338 (block 410). Note that an example of the task processor 350 is one of multiple threads of execution in the child process 202, not a physical processor such as a CPU.

The parent process 200 then posts the request 100 to the selected or created task processor 350 of the selected or created child process 202 (block 414). The posting of the request 100 is completed, for example, when a CORBA object in the task processor 350 receives the request 100. The task processor 350 may utilize one thread to push the request 100 into a first-in first-out request queue, and another thread to pop each request 100 from the request queue and to process the request 100 as the task 204. When the processing of the task 204 is complete, the task processor 350 notifies a task performance monitor 322 of the parent process 200 (block 416). This notification is completed, for example, when a CORBA object in the task performance monitor 322 receives the notification. In one embodiment, a listener object may be created by the task performance monitor 322 for each task 204. The task performance monitor 322 determines whether the task processor 350 and its corresponding child process 202 have one or more task error conditions resulting from the processing of the task 204 (block 418). For example, the task performance monitor 322 may determine that the task processor 350 has exceeded a maximum task processing time in the processing of the task 204, resulting in a task error condition for the task processor 350 and an ineligibility and/or error condition for its corresponding child process 202. Information about these conditions may be stored in child descriptor objects and task processor descriptor objects in the memory 310. If the task performance monitor 322 determines that a task error condition results from the processing of the task 204, then an error notification is provided (block 422). This error notification may be provided by an error notifier 324 of the parent process 200 to another process running on CPU 306, and may be provided directly to the client computer 300. If no task error condition results from the processing of the task 204, then the monitoring of the request 100 completes (block 420).

Figure 5:
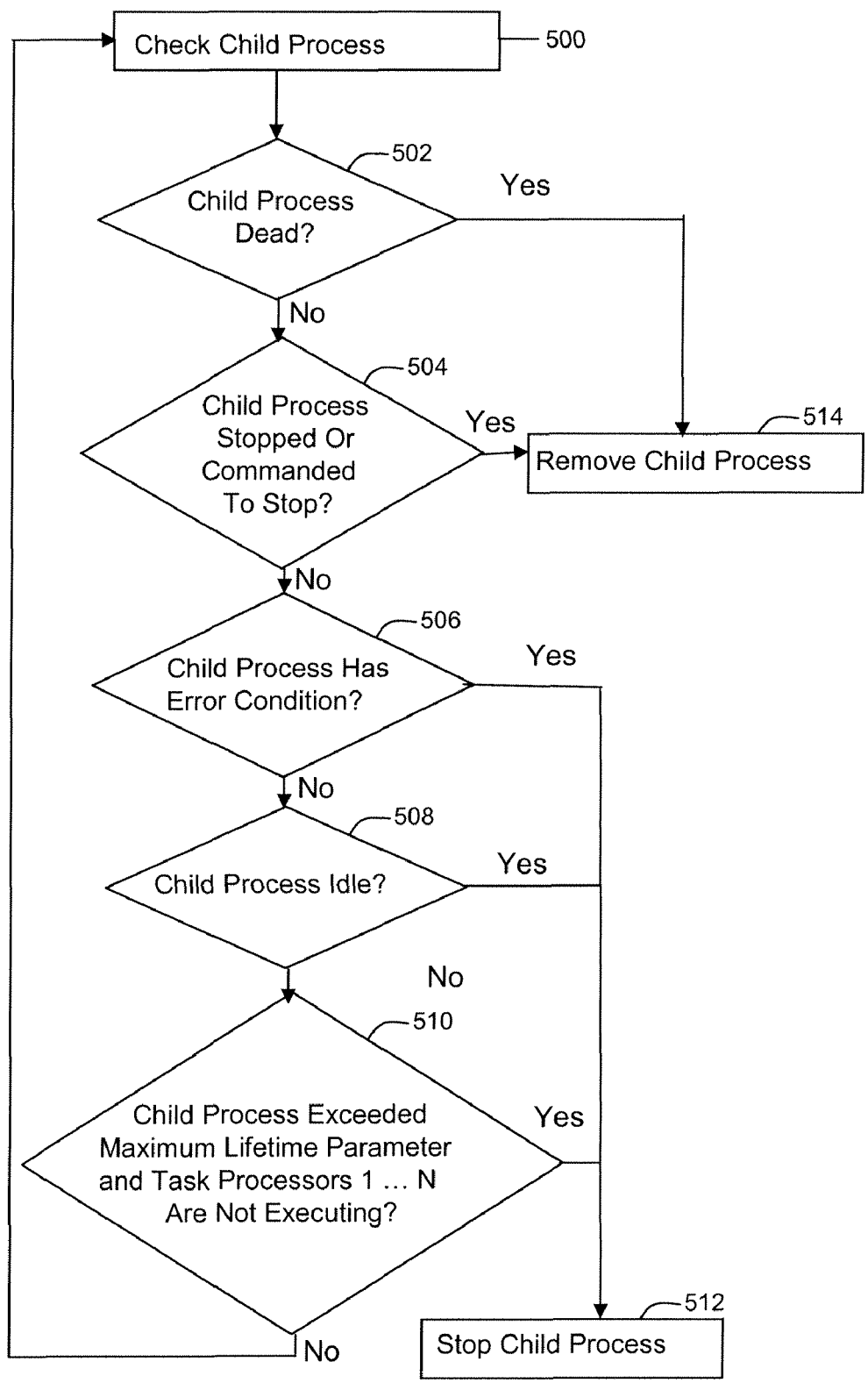
FIG. 5 illustrates processing operations associated with monitoring, stopping, and removing a child process, in accordance with one embodiment of the present invention.

FIG. 5 illustrates processing operations associated with monitoring, stopping, and removing a child process 202, in accordance with one embodiment of the present invention. A child remover 330 of the parent process 200 checks each child process 202 to determine if the child process 202 should be stopped and removed by the child remover 330 (block 500). The child remover 330 may be implemented as a thread that iterates through the child description information for child processes 202 contained in child descriptor objects in the memory 310. This thread may execute periodically, where the period may be set to a value such as 10 seconds. Other modules, such as the child monitor 332, the task performance monitor 322, and the child controller 334, may be implemented as threads that monitor each child process 202 and update the child descriptor objects in the memory 310. In this embodiment, the child remover 330 may go through two phases to remove a child process 202, which the child remover 330 completes on successive iterations. In the first phase, the child remover 330 may command the child process 202 to stop, or may remove the child process 202 immediately, in which case there is no second phase. If the child remover 330 commanded the child process 202 to stop in the first phase, then the child remover 330 removes the child process 202 in the second phase. Removal of the child process 202 may mean the removal of the child description information and the child descriptor object associated with the child process 202 and stored in the memory 310. A child process that is stopped and is subsequently determined to be not alive is designated as a dead child process.

The child remover 330 checks whether the child process 202 is dead (block 502), based on child description information updated by the child monitor 332. The child monitor 332 determines whether the child process 202 is dead, as described previously. If the child process 202 is dead, then the child remover 330 proceeds to block 514 and removes the child process 202. The child remover 330 checks whether the child process 202 has been stopped or has been commanded to stop by the child remover 330 (block 504), based on the child description information. In either case, the child remover 330 proceeds to block 514 and removes the child process 202. The child process 202 may already be stopped as a result of a prior command to stop or as a result of the child process 202 stopping itself. The child process 202 may stop itself using its management module 356 if, for example, its parent monitor 354 determines that the child process 202 has not received a keep-alive notification from the parent process 200 within a maximum response time. On the other hand, in error scenarios the child process 202 may not have received or may not have responded to the stop command, so the child remover 330 may not rely on the child process 202 being stopped before removing the child process 202 in block 514.

Next, the child remover 330 checks whether the child process 202 has an error condition (block 506), based on child description information updated by the task performance monitor 322. An example of an error condition is a task processor 350 of the child process 202 exceeding a maximum task processing time during the processing of a task 204. If the child process 202 has an error condition, the child remover 330 proceeds to block 512 and commands the child process 202 to stop. The child remover 330 checks whether the child process 202 is idle (block 508), based on child description information updated by the child controller 334. The child process 202 may be determined to be idle if, for example, each task processor 350 on the child process 202 has been idle for the maximum idle time, has exceeded a maximum task processing time, or has been stopped. If the child process 202 is idle, the child remover 330 proceeds to block 512 and commands the child process 202 to stop. The child remover 330 checks whether the child process 202 has exceeded a maximum lifetime parameter, as described previously, and whether each task processor 350 on the child process 202 is not executing (block 510), based on child description information updated by the child controller 334. The task processor 350 may not be executing, for example, because the task processor 350 is idle, has exceeded a maximum task processing time, or is stopped. If the condition in block 510 is met, the child remover 330 proceeds to block 512 and commands the child process 202 to stop. In one embodiment, a listener object created by the task performance monitor 322 for each task 204 processed or awaiting processing by the task processor 350 of the child process 202 may be removed by the child remover 330 upon completion of the task 204, without removal of the child process 202.

The types of error conditions that lead to a child process being stopped (block 512) vary. An example error condition is the product of the number of task processors 350 and up-time for child process 202 exceeding a maximum value. Other product and maximum values may also be used. The product of the number of task processors created in the child process and the processing time of each process may be compared to a maximum value.

Figure 6:
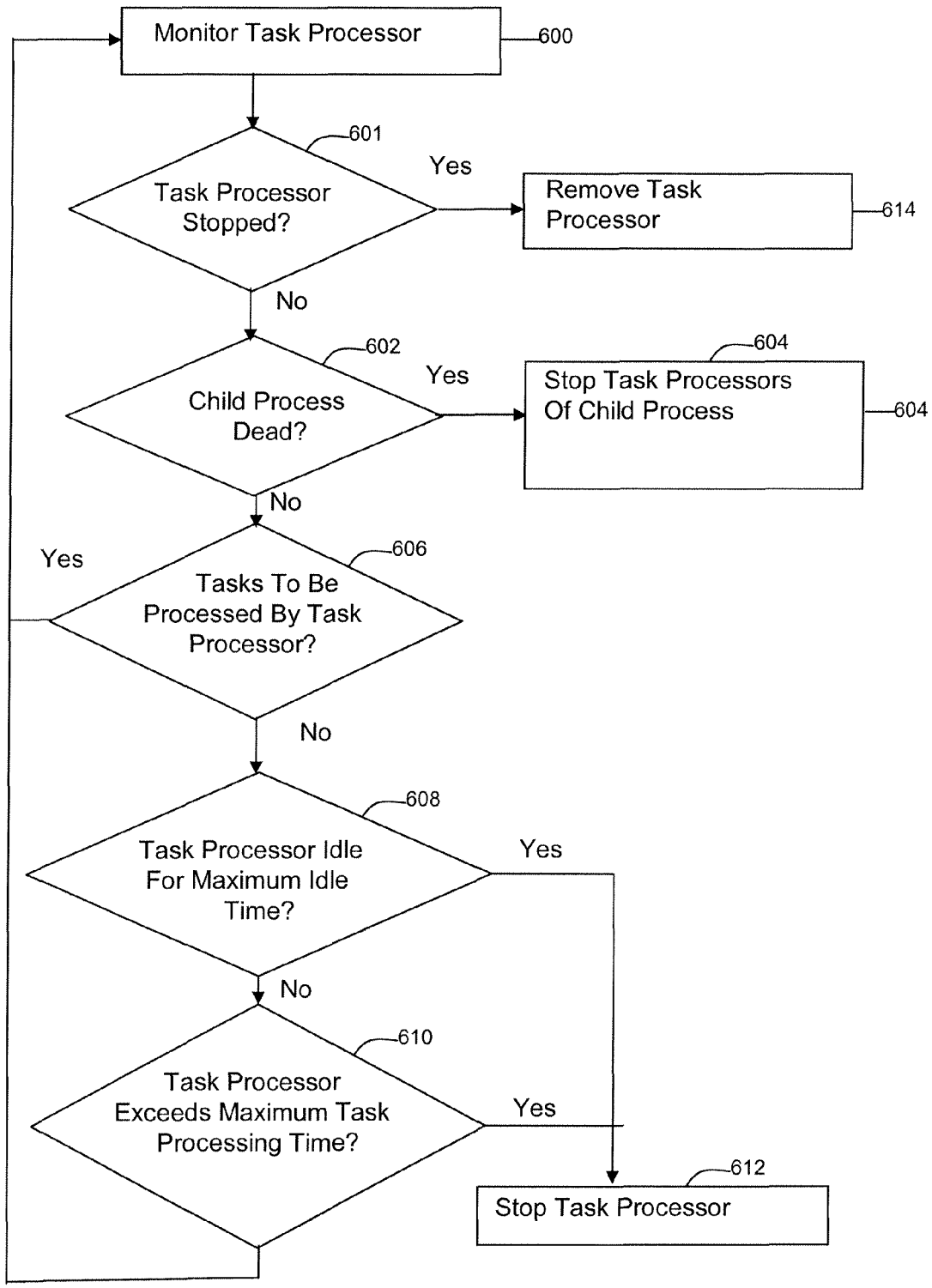
FIG. 6 illustrates processing operations associated with monitoring, stopping, and removing a task processor, in accordance with one embodiment of the present invention.

FIG. 6 illustrates processing operations associated with monitoring, stopping, and removing a task processor 350, in accordance with one embodiment of the present invention. A task processor remover 340 of the parent process 200 checks each task processor 350 to determine if the task processor 350 should be stopped and removed by the task processor remover 340 (block 600). The task processor remover 340 may be implemented as a thread that iterates through the task processor description information for task processors 350 contained in task processor descriptor objects in the memory 310. This thread may execute periodically, where the period may depend on the maximum idle time for the task processor 350 and the connection timeout time. Other modules, such as the child monitor 332, the task performance monitor 322, and the child controller 334, may be implemented as threads that monitor each task processor 350 and update the task processor descriptor objects in the memory 310. In this embodiment, the task processor remover 340 may go through two phases to remove a task processor 350, which the task processor remover 340 completes on successive iterations. In the first phase, the task processor remover 340 may command the task processor 350 to stop. The task processor controller 352 of the child process 202 stops the task processor 350. The task processor remover 340 then removes the child process 202 in the second phase. Removal of the task processor 350 may mean the removal of the task processor description information and the task processor descriptor object associated with the task processor 350 and stored in the memory 310.

The task processor remover 340 checks whether the task processor 350 is stopped (block 601), based on task processor description information updated by the task processor remover 340. If the task processor 350 is stopped, then the task processor remover 340 proceeds to block 614 and removes the task processor 350. The task processor remover checks whether the child process 202 executing the task processor 350 is dead (block 602), based on child description information updated by the child monitor 332. The child monitor 332 determines whether the child process 202 is dead, as described previously. If the child process 202 is dead, then the task processor remover 340 proceeds to block 604 and stops all task processors 350 of the child process 202.

The task processor remover 340 checks whether there are tasks 204 and requests 100 awaiting processing by the task processor 350 (block 606), based on task processor description information updated by the child controller 334 and the task performance monitor 322. If there are tasks 204 awaiting processing, no further checks are done until the next iteration of the task processor remover 340. If not, then the task processor remover 340 proceeds to block 608. In block 608, the task processor remover 340 checks whether the task processor 350 has been idle for more than the maximum idle time, based on task processor description information updated by the child controller 334. If so, the task processor remover 340 proceeds to block 612 and commands the task processor controller 352 of the child process 202 to stop the task processor 350. In block 610, the task processor remover 340 checks whether the task processor 350 has exceeded the maximum task processing time for a task 204, based on task processor description information updated by the task performance monitor 322. If so, the task processor remover 340 proceeds to block 612 and commands the task processor controller 352 of the child process 202 to stop the task processor 350. If the task processor remover 340 commands the task processor controller 352 for the child process 202 to stop the task processor 350 and the command fails, an ineligibility condition is created for the child process 202.

The child processes 202 may be placed into categories. One or more categories may apply all conditions in the child description information of a child process 202 to a removal or ineligibility determination for the child process 202, and one or more categories may apply only some conditions to the removal or ineligibility determination for the child process 202. For example, a child process 202 may be placed into a category that does not apply the maximum lifetime parameter for the child process 202 to the removal or ineligibility determination for the child process 202, if more than a certain percentage of the total number of child processes 202 are already in another category for which the maximum lifetime parameter is applied to the removal or ineligibility determination. However, there may be conditions, such as a child process being dead, for which all categories apply the condition to the removal or ineligibility determination.

In an embodiment, a task processor descriptor object in the parent process 200 may be recycled, which means completely reconfigured. When a task processor descriptor object is recycled, the associated task processor 350 in the child is stopped and a new task processor 350 is created, possibly in a different child process. Recycling a task processor descriptor object may be a two-phase operation: determine the best task processor 350 to stop, then determine the best child process 202 on which to start the new task processor 350. The task processor selector 336 determines the best task processor 350 to stop. For example, each task processor 350 may be assigned a rank, and the task processor 350 with the highest rank is stopped. The logic used to determine the best child process 202 on which to put the new task processor 350 is the same as that used when selecting the child process 202 for a report processing request 100. Recycling can provide load-balancing across child processes, and also limits the lifetime of any individual task processor.

Figure 7:
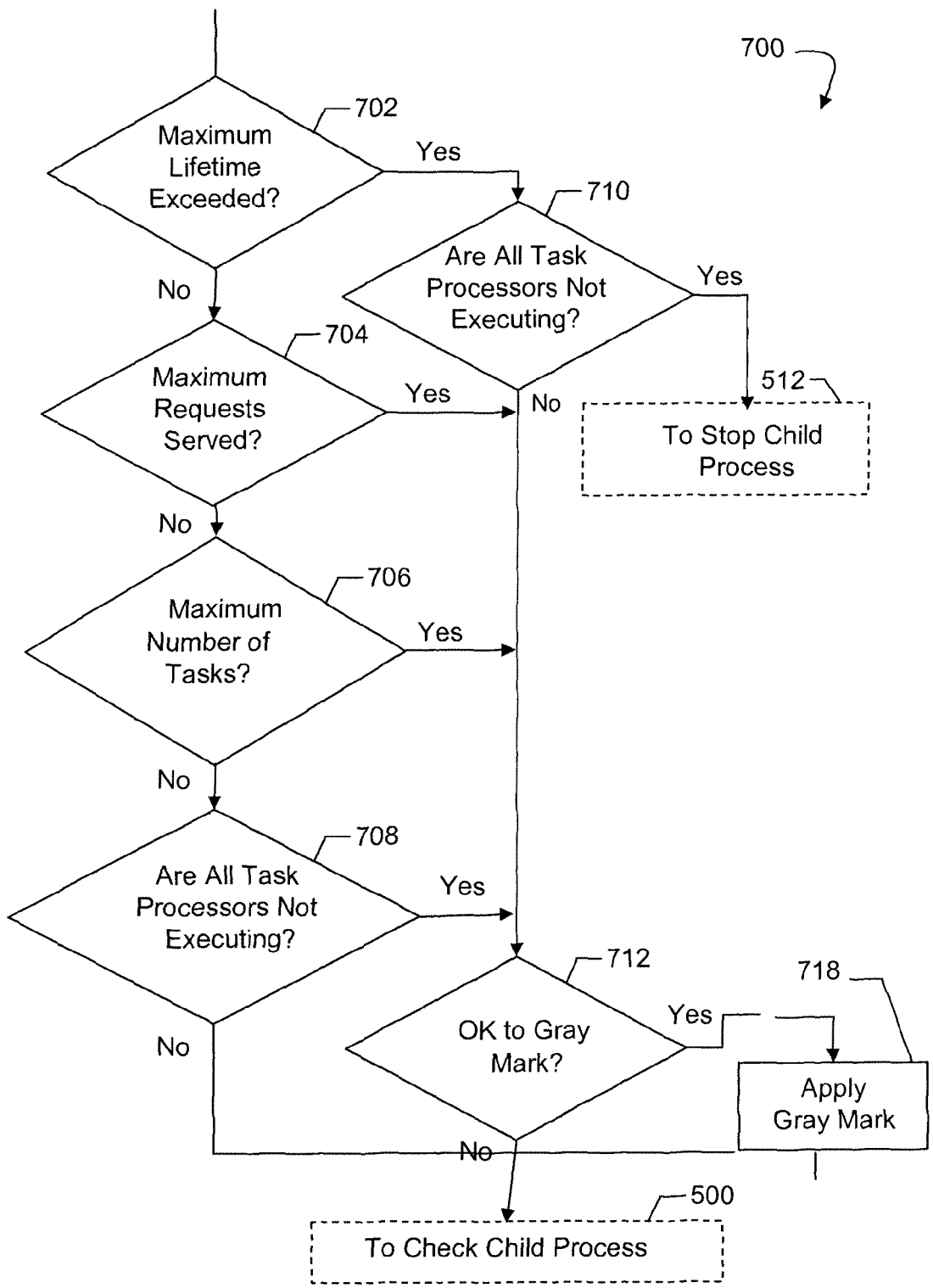
FIG. 7 illustrates processing operations associated with monitoring, stopping, and removing a task processor, in accordance with another embodiment of the present invention.

FIG. 7 illustrates processing operations 700 associated with monitoring, stopping, and removing a child process 202, in accordance with one embodiment of the present invention. Processing operations 700 are one example of operations that can be included in block 510. Processing operations 700 can lead to a stop child process (block 512), which commands the child to stop. Alternatively, these operations lead to check child process (block 500).

In this example, a child process is not assigned additional tasks when it is gray marked. A child remover 330 of the parent process 200 checks each child process 202 to determine if the child process 202 should be stopped and removed by the child remover 330. The child remover 330 checks whether the child process 202 has exceeded its maximum lifetime (block 702). If the child process 202 has exceeded its maximum lifetime, the child remover 330 checks to see if all the task processors 350 on the child process 202 are not executing (block 710). If all the task processors 350 on child process 202 are not executing the child will be commanded to stop (block 512). If there is at least one task processor 350 on child process 202 executing then a gray mark determination is needed for child process 202 (block 712). If the child process 202 has not exceeded its maximum lifetime, the child remover 330 checks to see if the number of requests that child process 202 has handled has exceed a threshold (block 704). If the number of requests that child process 202 has handled does exceed a threshold, then a gray mark determination is needed for child process 202 (block 712). Otherwise, the child remover 330 checks to see if child process 202 has exceeded a maximum number of task processors (block 706). If number of task processors exceeds a threshold then a gray mark determination is needed (block 712). Otherwise, the child remover 330 checks to see if to see if all the task processors 350 on the child process 202 are not executing (block 708). If all the task processors 350 on child process 202 are not executing then a gray mark determination is needed for child process 202 (block 712). If there is at least one task processor 350 on child process 202 executing then the process flow returns to the check child process (block 500). However, the child remover 330 may iterate through other child processes or examine a given child process another time.

In block 712 a gray mark determination is made. Gray marks are not always assigned. For example, exceeding the maximum number of task processors (block 706) does not mean that the child process 202 will get a gray mark. The maximum number of task processors is a soft limit. Same for limits imposed in blocks 702, 704 and 708. The parent process 200 may allow a child to exceed a limit in order to provide the maximum number of task processors. For example, if all child processes created by parent process 200 have exceeded their maximum number of task processors and were given gray marks, then no new task processors could be created until a new child process was created. This could not happen until an existing child process idled out and was stopped. To prevent this situation, the parent will not assign a gray mark if it would cause the percentage of child processes that have been requested to stop (also called black marked) or gray mark to exceed a configurable percentage. This percentage can be specified. In an embodiment of the present invention the percentage is 50 percent. If a gray mark is applied is done by the child remover 330 in block 718. The child remover 330 then proceeds to block 500 regardless if a gray mark has been applied or not.

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hardwired circuitry in place of, or in combination with, machine-executable software instructions.

From the foregoing, it can be seen that an apparatus and method for reliable report processing are described. The foregoing description, for purposes of explanation, used specific nomenclature to provide a thorough understanding of the invention. It will be appreciated, however, that embodiments of the invention can be in other specific forms without departing from the spirit or essential characteristics thereof. The described embodiments are not intended to be exhaustive or to limit the invention to the precise forms disclosed; obviously, many modifications and variations are possible in view of the above teachings. The presently disclosed embodiments are, therefore, considered in all respects to be illustrative and not restrictive. The embodiments were chosen and described in order to best explain the principles of the invention and its practical applications; they thereby enable others skilled in the art to best utilize the invention and various embodiments with various modifications as are suited to the particular use contemplated. It is intended that the following claims and their equivalents define the scope of the invention.

What is claimed is:

1. A non-transitory computer readable medium comprising executable instructions to:
   define a processing task queue;
   define a request receiver module to:
      receive a first request, and
      place the first request in the processing task queue; and
   define a parent process to:
      control management functions of a set of child processes,
      selectively assign tasks to corresponding one or more child processes of the set of child processes, the tasks being executed on a server that implements the parent process and the set of child processes,
      apply a mark to an identified child process, wherein the mark indicates the identified child process is ineligible for further task assignment; and
      retrieve data through the marked child process.

2. The computer readable medium of claim 1 wherein the request receiver module is a Common Object Report Broker Architecture (CORBA) object.

3. The computer readable medium of claim 1 wherein the management functions include creation and removal of the corresponding one or more child processes of the set of child processes.

4. The computer readable medium of claim 1 wherein the management functions include monitoring the set of child processes.

5. The computer readable medium of claim 1 wherein the management functions include determining whether and when to stop a task.

6. The computer readable medium of claim 1 wherein the mark is applied when the identified child process should be stopped but is still executing a task.

7. The computer readable medium of claim 1 wherein the mark is applied when the identified child process has exceeded a maximum life time.

8. The computer readable medium of claim 1 wherein the mark is applied when the identified child process has exceeded a maximum number of tasks.

9. The computer readable medium of claim 5 wherein determining whether and when to stop a task includes applying a termination mark to a task.

10. The computer readable medium of claim 9 wherein the termination mark is applied when a process maximum life time is exceeded.

11. The computer readable medium of claim 1, wherein the selective assignment is performed using a request router.

12. A method implemented by a computer, the method comprising:
   receiving, at a hierarchical report processor implemented on a server, a first report processing request;
   placing the first report processing request in a queue;
   selectively assigning, at the server, the first report processing request to an identified child process of a set of child processes implemented on the server;
   applying a mark to the identified child process, wherein the mark indicates that the identified child process is ineligible for further task assignment;
   retrieving data from a data source through the identified and marked child process;
   formatting the data in accordance with a report schema to form a report; and
   supplying the report in response to the first report processing request.

13. The method of claim 12 wherein receiving includes receiving the first report processing request through a Common Object Report Broker Architecture (CORBA) object.

14. The method of claim 12 further comprising removing a child process of the set of child processes.

15. The method of claim 14 further comprising monitoring the set of child processes.

16. The method of claim 12 wherein applying includes applying the mark to the identified child process when the identified child process has exceeded a maximum life time.

17. The method of claim 12 wherein applying includes applying the mark to the identified child process when the identified child process has exceeded a maximum number of tasks.

* * * * *